United States Patent [19]
Gauthier et al.

[11] Patent Number: 5,227,709
[45] Date of Patent: Jul. 13, 1993

[54] CLOSED LOOP SINGLE STEP RESPONSE BY OPEN WINDING VOLTAGE FEEDBACK SYSTEM AND METHOD FOR MULTIPLE PHASE STEP MOTORS

[75] Inventors: Raymond G. Gauthier, Soquel; Ronald T. Whaley, Scotts Valley, both of Calif.

[73] Assignee: Seagate Technology, Inc., Scotts Valley, Calif.

[21] Appl. No.: 594,833

[22] Filed: Oct. 9, 1990

[51] Int. Cl.$^5$ ............................................. G05B 19/40
[52] U.S. Cl. ...................................... 318/685; 318/696
[58] Field of Search ................. 318/696, 685; 368/157; 360/78.04

[56] References Cited

U.S. PATENT DOCUMENTS

| | | | |
|---|---|---|---|
| 3,727,121 | 4/1973 | Rich | 318/696 X |
| 4,258,622 | 3/1981 | Estrabaud et al. | 318/685 X |
| 4,510,429 | 4/1985 | Squire | 318/696 |
| 4,709,199 | 11/1987 | Wang et al. | 318/696 |

OTHER PUBLICATIONS

Ninth Annual symposium on incremental motion, Proceedings pp. 115–124, Kenjo et al 1980.

IBM Technical Disclosure vol. 18, No. 12 May 1976 p. 4123, Lopour et al.

Primary Examiner—William M. Shoop, Jr.
Assistant Examiner—Karen Masih
Attorney, Agent, or Firm—Flehr, Hohbach, Test, Albritton & Herbert

[57] ABSTRACT

A closed-loop voltage feedback system and method for control of the step response of a multiple-phase step motor, wherein the rotor oscillation amplitude is smaller than the period of the back emf voltage waveform, achieving minimization of the step response ringout time. Thus, when used in computer memory disc drives, the present invention provides faster data acquisition by reducing settling time and seek time. The claimed method includes steps for sampling the back emf voltage induced across an open phase winding, producing a continuous feedback signal proportional to the velocity of the step motor, and applying the continuous feedback signal to an energized phase winding to produce damping. The method may also be used in conjunction with open or closed loop position feedback for microstepping the motor to nondetent positions. The present invention eliminates the need for external sensors or an extensive amount of electronics.

15 Claims, 12 Drawing Sheets

CLOSED LOOP SINGLE STEP RESPONSE BY OPEN WINDING VOLTAGE FEEDBACK SYSTEM AND METHOD FOR MULTIPLE PHASE STEP MOTORS

BACKGROUND OF THE INVENTION

1. Field of the Invention

The present invention relates generally to a closed loop control system and method for step motors to minimize step response ringout time and more particularly to a method for providing closed loop control of ten phase step motors by simple voltage feedback. The method is especially useful in decreasing the access time in a disc drive where the step motor is used to position the transducer for accessing data.

2. Description of Prior Art

A step motor is an electromechanical device which translates electrical pulses to discrete mechanical positions. When a voltage is applied to the input of a step motor, the motor's rotor assumes a discrete position. The stepping process in all stepping motors is accomplished by switching voltages to the input windings or stator phases in a particular sequence.

The single step response for a step motor (velocity v. time) allows one to compare the electronic damping provided by various drive schemes. The rate of decay of the velocity oscillations as the rotor oscillates about its new stable equilibrium point after being issued a step command is the step response ringout time. Electronic damping results from the velocity-dependent back electromotive force voltage (back emf), which can cause currents to flow in either the excited or unexcited stator phase windings. Back emf voltages are induced in the stator windings due to the relative motion of the rotor and stator, and thus depend upon the location of the rotor relative to the stator and its speed. These back emf generated currents, in turn, produce a torque that opposes rotor rotation.

Open loop control methods for step motors in which a minimum ringout time can be achieved by correctly timing the step input command pulses, are well known. The efficacy, however, of the open loop approach is limited because motor parameters will vary due to manufacturing tolerances. Thus, with an invariant control algorithm, the step response will no longer have minimum ringout for every motor.

Closed loop control methods for step motors offer several advantages over open loop control methods, including greater consistency and effectiveness in minimizing the step response ringout time of a step motor. The principles of closed loop methods to minimize the step response ringout time have been described in the literature. For example, reference is made to U.S. Pat. No. 4,556,836, entitled MULTIPHASE MOTOR DAMPING METHOD AND CIRCUIT ARRANGEMENT, issued to L. Antognini. Such closed loop methods, however, have required an external sensor or an extensive amount of electronics to decode the winding voltages in order to produce a feedback signal.

Therefore, it is an objective of this invention to use and incorporate a simple voltage feedback method that uses the fact that the motor step size is small compared to one electrical cycle of the back emf of the motor. This objective is especially desirable in a disc drive where the stepper motor is utilized to position a transducer. In current disc drives, track-to-track spacing is very small and positioning of the transducer on a target track must be very precise.

SUMMARY OF THE PRESENT INVENTION

Broadly, the invention discloses a simple closed-loop voltage feedback method which produces damping in order to minimize the step response ringout time of a multiple-phase step motor, wherein the motor's step size is small compared to one electrical cycle of the back emf of the motor. By sampling the back emf voltage of an open phase winding and applying that voltage to another open phase winding, it is possible to proportionally control the voltage across the other open phase winding to produce damping.

In a preferred embodiment, the present invention is applied to a ten phase step motor driven in a star drive configuration. Additionally, the present invention can be used in conjunction with open or closed-loop positioning feedback system in a disc drive.

It is therefore an object of the present invention to provide an improved closed-loop control system and method for a multiple-phase step motor to minimize the step response ringout time of the motor, and thereby optimize the access time in moving a transducer to a new track and settling the transducer on the track.

Another object of the present invention is to provide a more dependable and less complex closed loop control system and method for step motors incorporated in disc drives.

BRIEF DESCRIPTION OF THE DRAWINGS

Additional objects and features of the invention will be more readily apparent from the following detailed description and appended claims when taken in conjunction with the drawings, in which:

FIG. 5A is a phase plane diagram which illustrates the open loop voltage and position response for two phases on;

FIG. 6B is a diagram which illustrates the corresponding single step response.

DESCRIPTION OF A PREFERRED EMBODIMENT

Figure 1A:
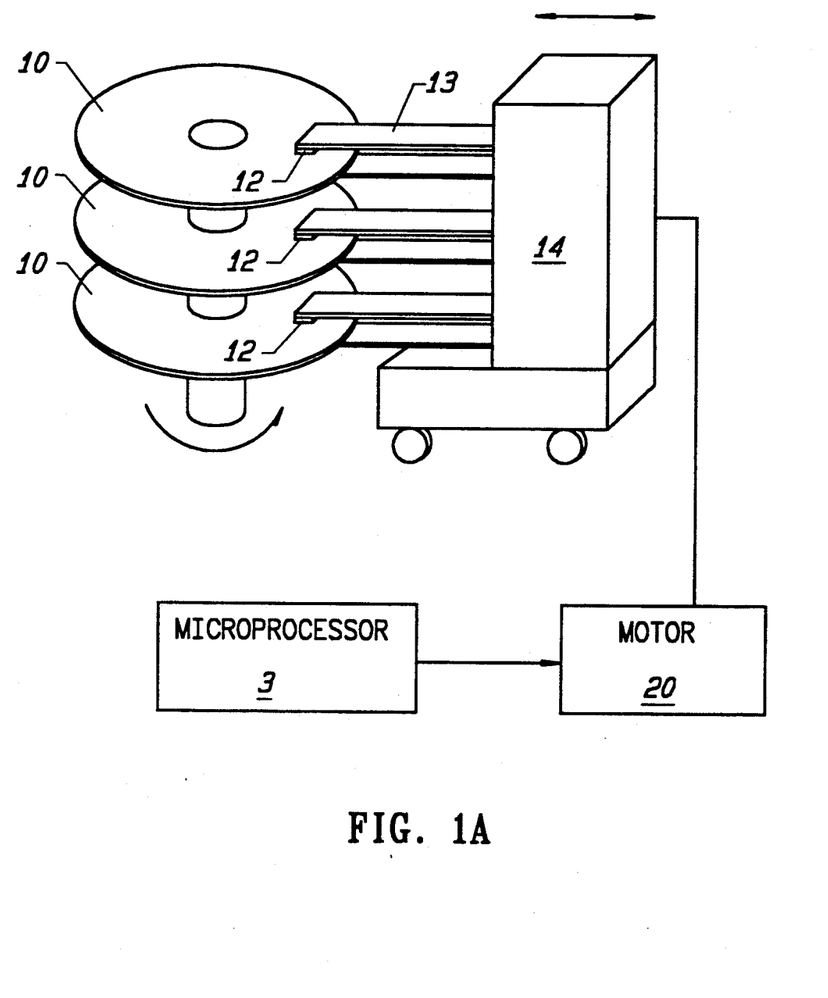
FIGS. 1a and 1b are block diagrams of circuitry enabling operation of the closed-loop voltage feedback method of the invention.

What is described hereunder is a closed-loop voltage feedback system and method for controlling the step response of a multiple phase step motor to optimize the positioning of a transducer over a target track on a disc. FIG. 1A is a block diagram showing schematically construction of a magnetic disc apparatus based on one or more discs 10 rotated at constant speed by a motor 11. A magnetic head 12 is provided on the tip of an arm 13 attached to a carriage 14 driven by a linear actuator, for example, a motor 20. This motor which is a step motor is energized by a precise number of pulses to move the actuator 14, and thereby the transducer 12 from an initial position to a target track. The objective of this invention is to enable the motor to quickly settle into its final stepped position, and thereby precisely and rapidly position the transducer at the target track.

Figure 7:
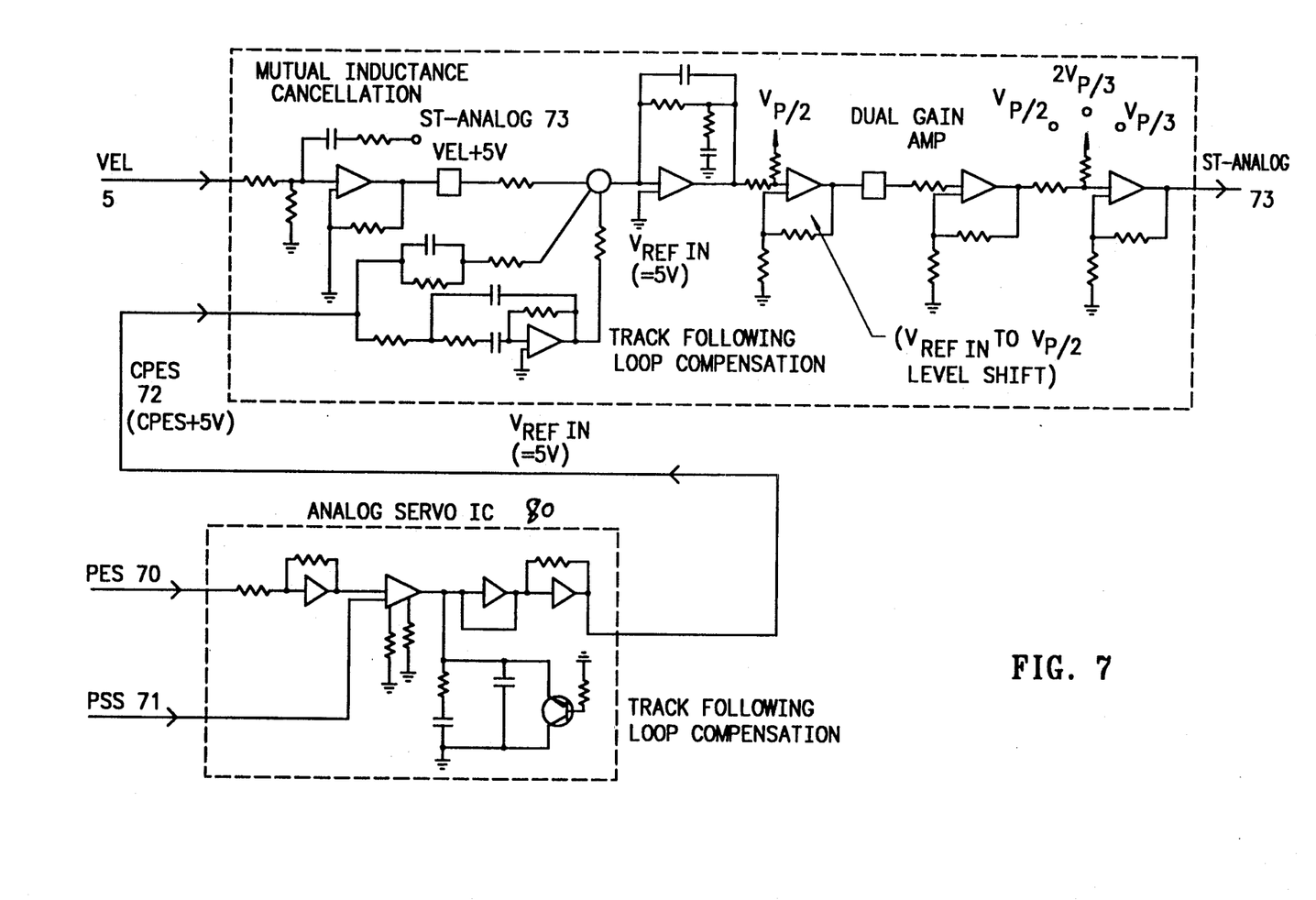
FIG. 7 is a diagram of circuitry which produces a damping signal from the closed-loop voltage feedback of the invention and open or closed-loop positioning feedback, for microstepping to nondetent positions.

Referring to FIG. 7, the position feedback for the disc drive servo is provided from the signal PES 270 which is derived from the servo patterns on the disc, being detected by the read/write head, amplified by the preamplifier and converted into a position error signal by the demodulator. The servo analog IC 80 applies the automatic gain control function and servo compensation to signal PES 70 to produce its output signal CPES 72. Signal 72 receives additional compensation and is then combined with the velocity signal 5. This combined signal then has compensation applied for a pole in the velocity loop transfer function due to the resistance and inductance of the motor windings as well as compensation for the effects of mutual inductance between motor windings. Thereafter, this compensated and combined velocity and position feedback signal forms the signal ST_ANALOG 73 which is applied to the appropriate motor winding to provide the necessary damping function as well as to control the stepper motor's angular position. Referring to FIG. 8, windings A and E are fully energized and winding C is partially energized by the combined and compensated velocity and position feedback signal ST_ANALOG 73 to control the stepper's angular position and velocity. Windings B and D are open and provide back emf voltage for the velocity feedback signal. In the nominal position the angle between the torque and back emf curve is 108 degrees, but than can vary from 90 to 126 degrees as the stepper motor is changed to position the data head over track centerline.

Although the preferred embodiment discloses that the feedback signal is applied to the phase which is energized with a partial current, in fact the signal may be applied to any winding which is not the sense winding. FIG. 7 illustrates a block diagram of circuitry enabling operation of the closed-loop voltage feedback method in accordance with the present invention, as applied to a ten-phase stepper motor of the type useful as the motor 20 in a disc drive.

Each of the five phase pair windings 1A-1E are controlled by a separate associated phase-winding power driver 2A-2E. Velocity feedback is enabled whenever one of the power drivers 2A-2E is in analog control mode, allowing a selected power driver to produce a linear signal for damping. The power driver output modes are controlled directly by a microprocessor 3, which performs two essential functions. First, the microprocessor selects an open phase winding to measure back emf voltage 5 by sending an appropriate EMF SELECT signal 4 to a pair of selectors 7A and 7B. Second, the microprocessor selects a power driver to receive the back emf signal for damping by sending an appropriate FEEDBACK SELECT signal 6 to a selector 7C.

Velocity feedback information is provided by the velocity feedback amplifier 8, which samples the voltage induced across an open phase winding and produces a back emf voltage signal 5 as its output.

The motor must have a step size small compared to one electrical cycle of the back emf of the motor in order for the back emf voltage induced in an open phase winding to be proportional to the velocity. The back emf voltage is a nonlinear signal being sinusoidal with one cycle equal to 360 degrees electrical angle. When the rotor oscillation amplitude is small compared to the period of the back emf waveform, and the electrical angle is near 90 degrees or 270 degrees on the back emf cycle, the nonlinear component of the back emf voltage is small and the back emf voltage 5 can be used to produce damping.

The motor is driven such that at least one winding is open to sense the back emf voltage and so that the velocity feedback signal is applied to either one or more of the open windings or one or more of the energized windings.

Figure 2:
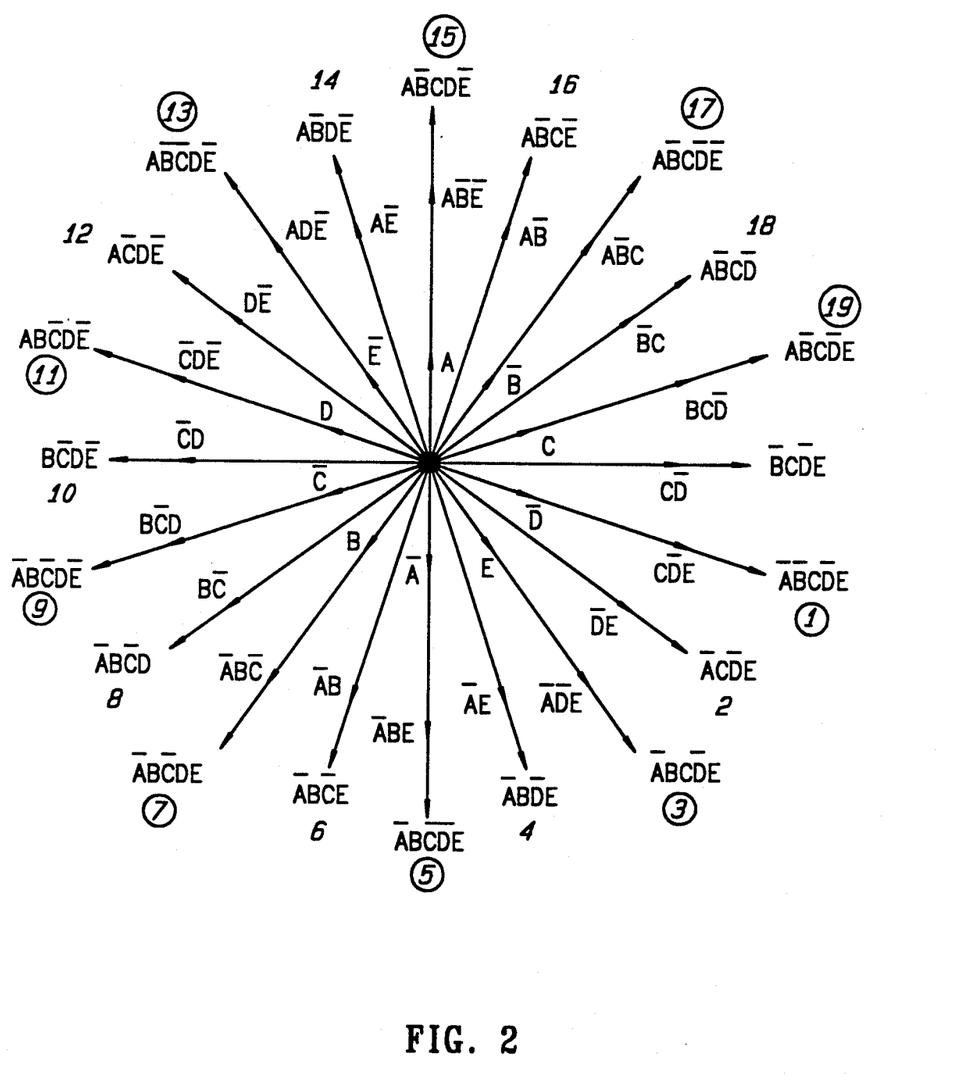
FIG. 2 is a vector diagram for a ten-phase motor in the half-step mode.

FIG. 2 shows the vector diagram for a ten-phase motor in the half-step mode. Each of the coils 1A-1E represents a phase pair. The motor can be driven in the half-step mode with either two/three, three/four, or four/five phase pairs on. It is possible to use the back emf voltage across an open phase winding to proportionally control the voltage across another phase winding to produce damping.

Figure 3A:
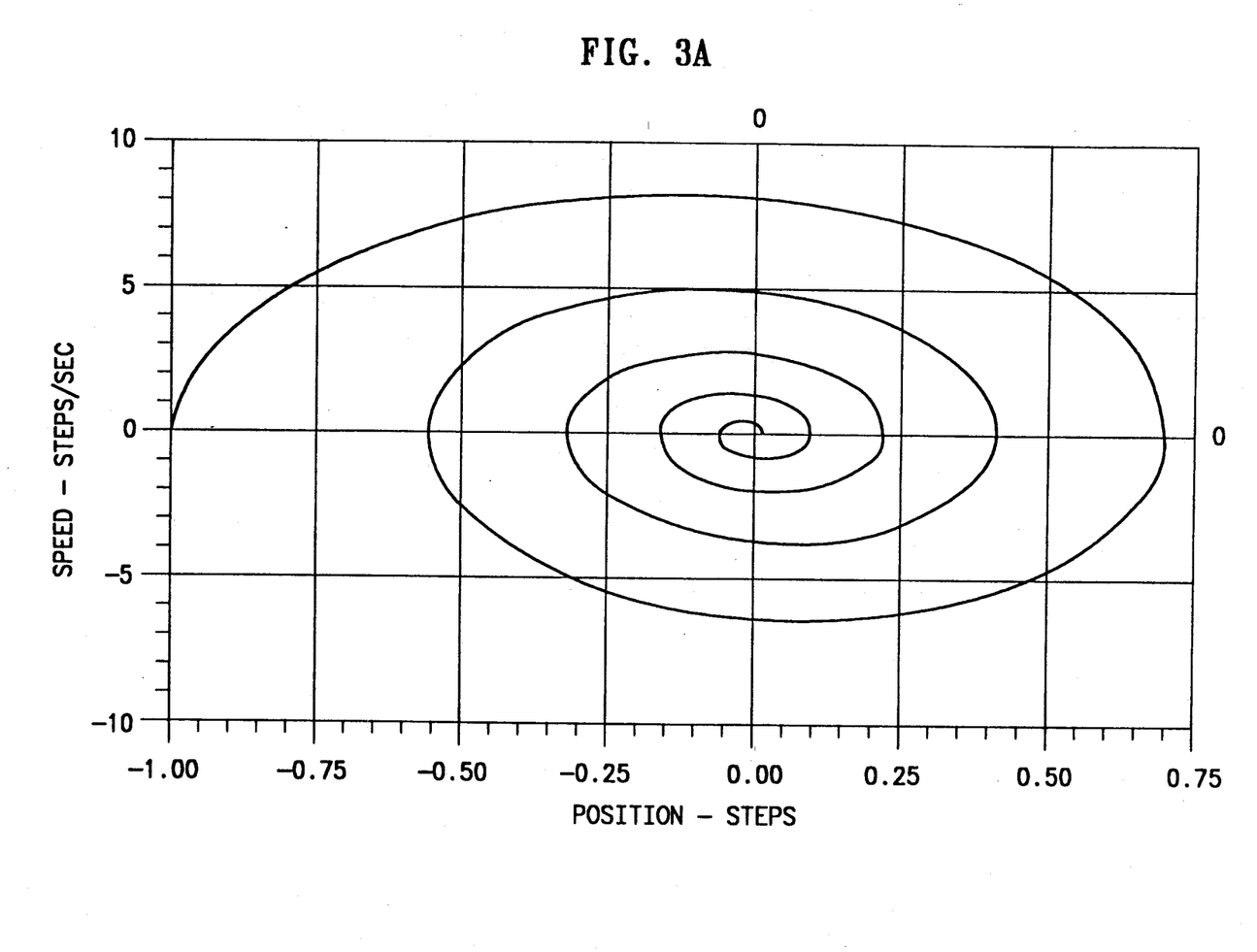
FIG. 3A is a phase plane diagram which illustrates the voltage and position response of a ten-phase motor landing on the three phase pair (on condition —C, D, and —E)
Figure 3B:
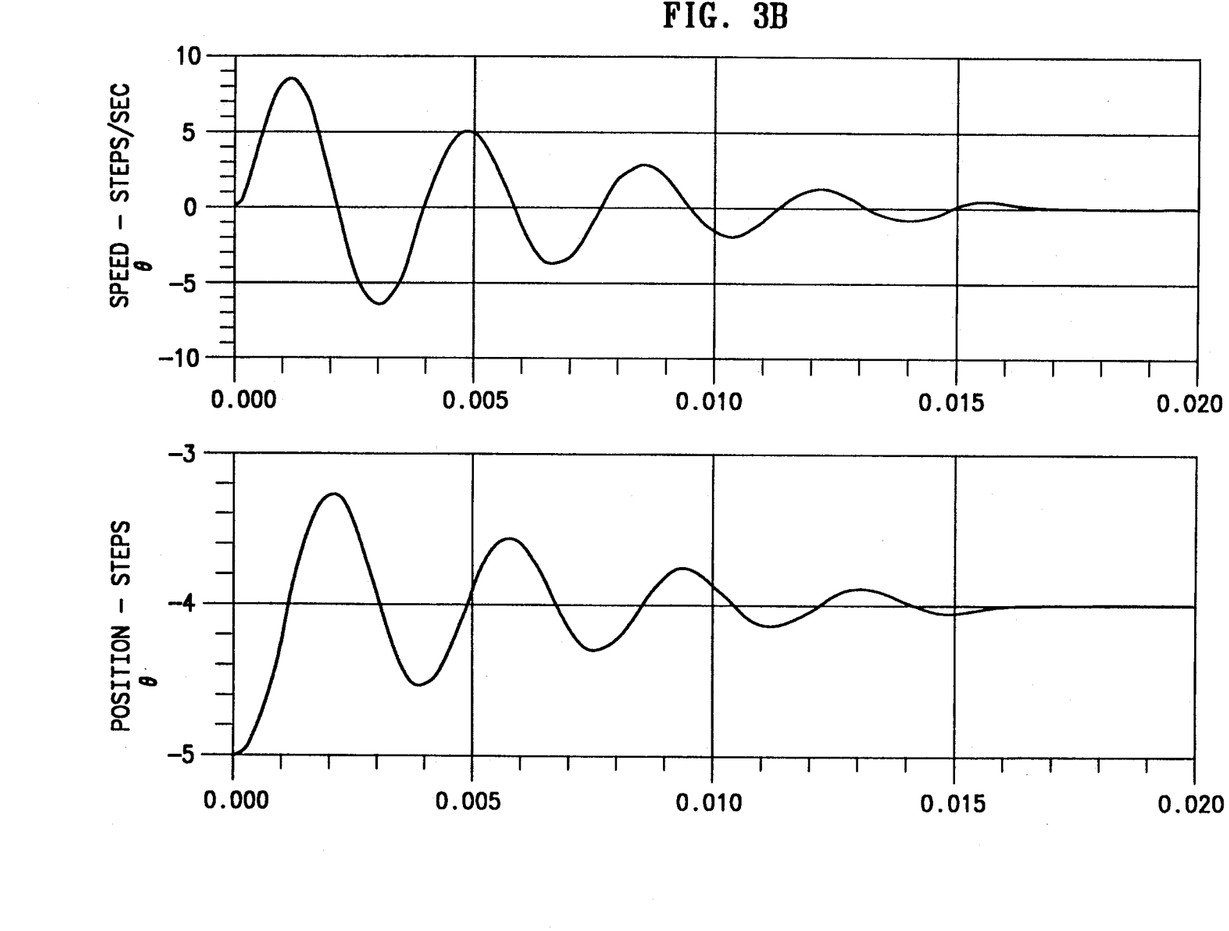
FIG. 3B is a diagram which illustrates the corresponding single step response.
Figure 3C:
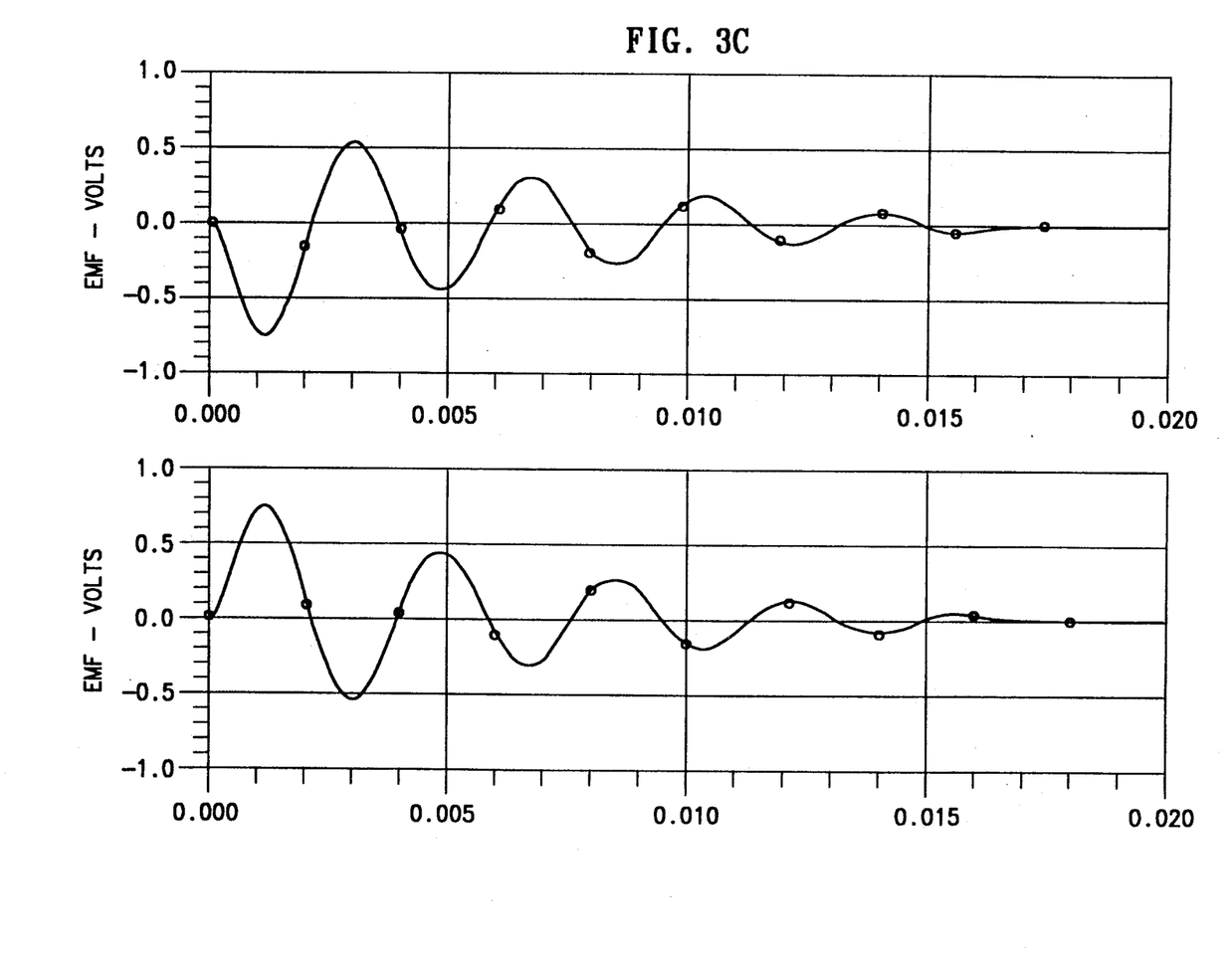
FIG. 3C is a diagram which illustrates the voltage across the open phase pairs (A, B)

Accordingly, when the motor is stepped with three phase pairs on, at any one time, two phase pairs are off. For example, if the motor lands on the three phase pair detent position, on condition (A,−B,−E), then phase pairs C and D are off. FIG. 3A illustrates the open loop response of the motor landing on this condition. The back emf voltage generated by phase pairs C or D position at this is 72 electrical degrees from the position vector (A,−B, −E), shown on FIG. 2. Therefore, measuring the back emf voltage across either open phase winding C or D will result in a velocity feedback signal with nearly minimal error due to nonlinearity. As is illustrated in FIGS. 3B and 3C, the back emf voltage of the off phase pair is proportional to the velocity because the rotor oscillation amplitude is small compare to the period of the back emf waveform. The velocity feedback signal is applied either to the other open phase pair or to at least one of the energized phase pairs to produce damping.

Further, in a preferred embodiment, the back emf voltage measured across one open phase pair is inverted and added to the back emf voltage measured across the other open phase pair to produce a velocity feedback signal with a vector 90 electrical degrees from the vector direction of the position vector, as is shown in FIG. 2. Thus, in the above example, by inverting the back emf voltage signal measured across open phase pair D and adding it to the back emf voltage signal measured across open phase pair C, a velocity feedback signal is produced whose magnitude is equal to the back emf constant (Kemf) times angular velocity of the rotor where kemf is proportional to the cosine of the motor electrical angle and the torque curve produced by the particular windings energized to control the angular position of the rotor is proportional to the sine of the electrical angle. Since the commanded rotor position is at 0 degrees of the sinusoidal torque curve, then when the rotor angular position is near its commanded rotor position, the cosinusoidal back emf constant Kemf will be at its most maximum and unchanging value relative to the electrical angle. Since one cycle of the torque or back emf curve corresponds to twenty steps and each step is equivalent to one data track spacing on the disc, and the expected excursions of the rotor angle around the commanded position due to overshoot and ringdown oscillations are on the order of ±1 tack or step, then the back emf constant Kemf will remain essentially constant for servo performance considerations during these excursions and therefore will provide essentially linear damping when applied to the appropriate energized phase pair (A, B or E).

Figure 4A:
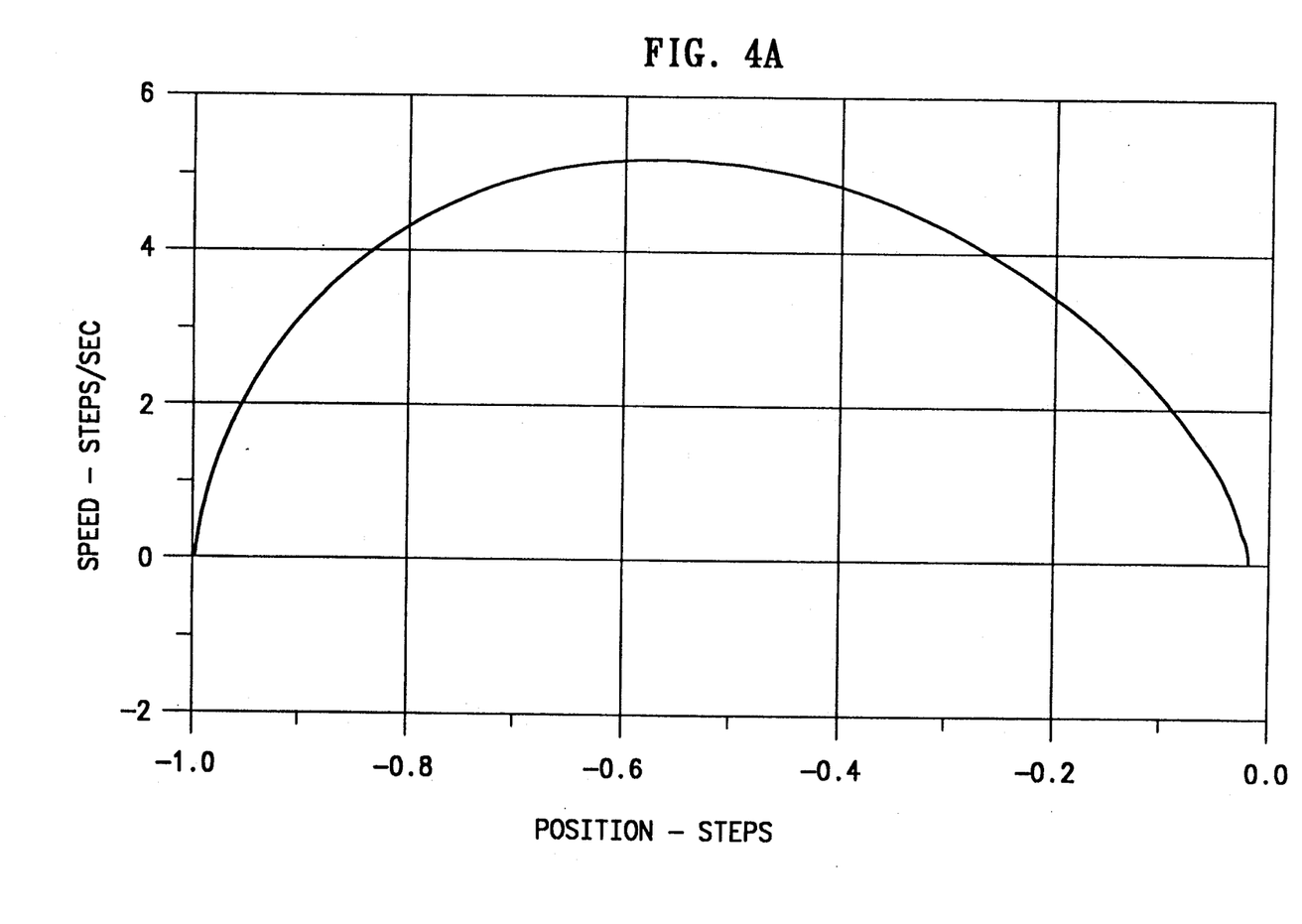
FIG. 4A is a phase plane diagram which illustrates the voltage and position response where the phase pair A voltage is used to control phase pair B.
Figure 4B:
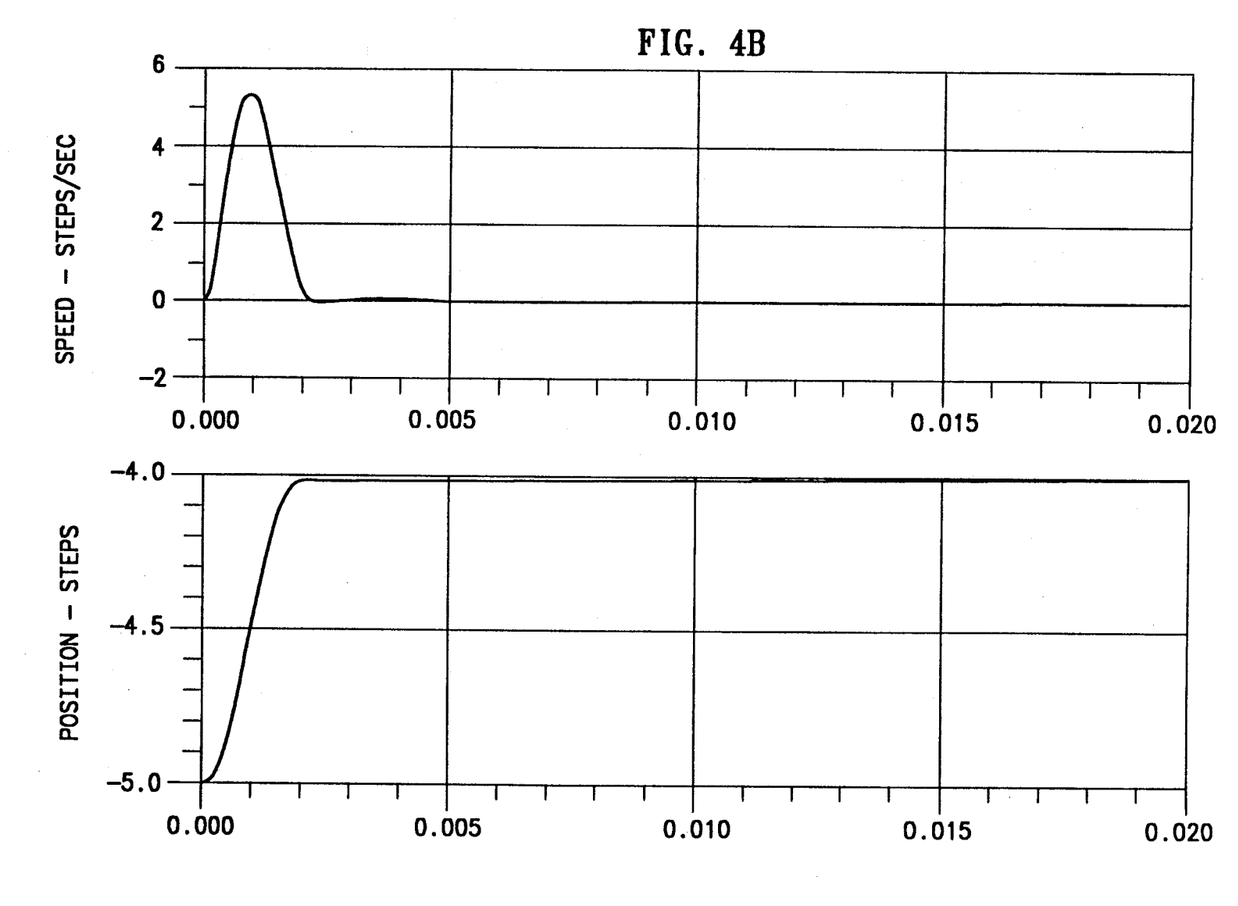
FIG. 4B is a diagram which illustrates the corresponding single step response.

As is illustrated in FIGS. 3B and 3C, the back emf voltage of the off phase pair is proportional to the velocity because the rotor oscillation amplitude is small compared to the period of the back emf waveform. FIG. 4A illustrates the improved response of the step motor with the application of the closed loop velocity feedback method of the present invention for three phase pairs on. As can be seen from FIG. 4B, the step response can be critically damped with the appropriate gain.

Figure 5A:
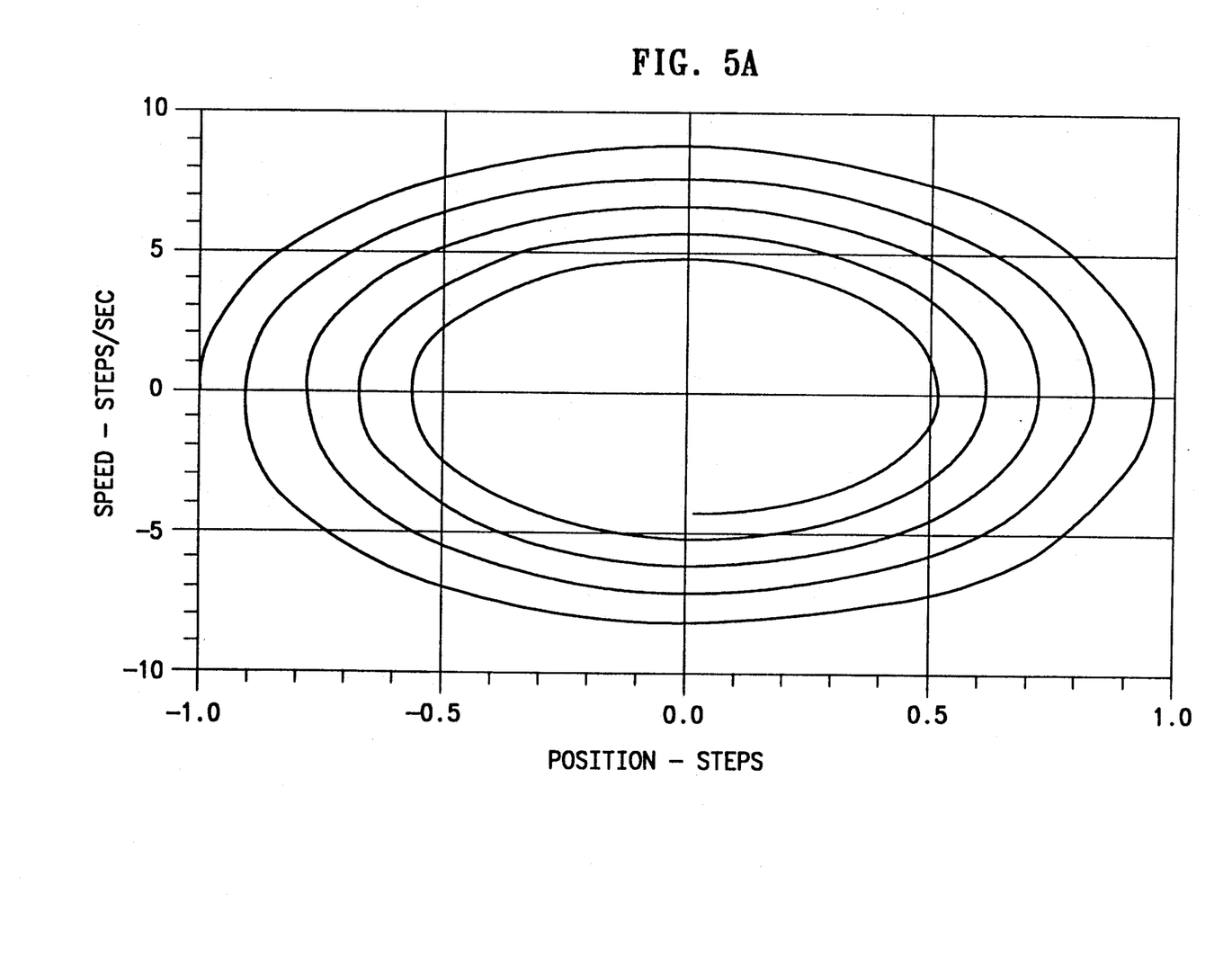
Figure 5B:
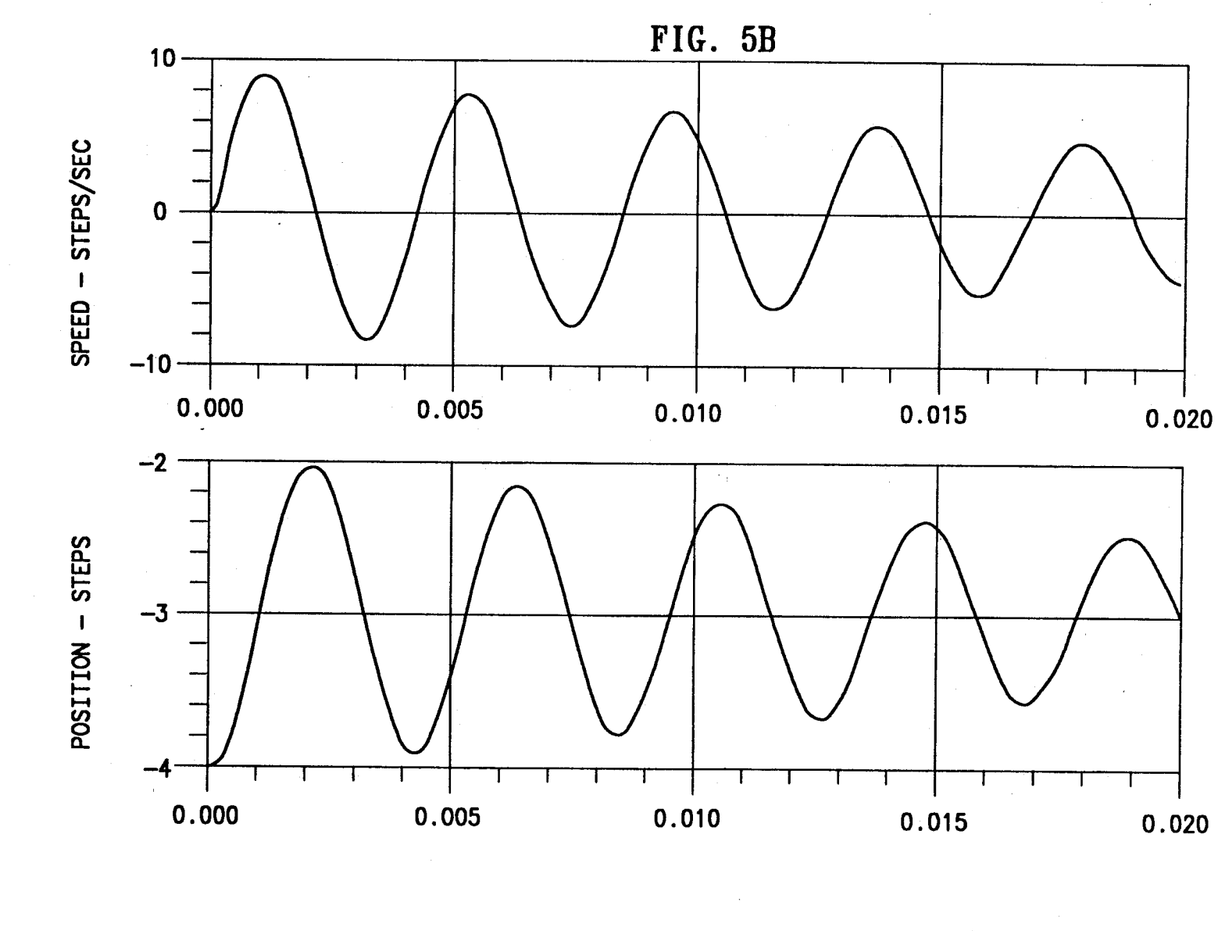
FIG. 5B is a diagram which illustrates the corresponding single step response.

FIGS. 5A and 5B illustrate the open loop response for two phase pairs on, which is more oscillatory than the response produced for three phase pairs on. When the motor is stepped with two phase pairs on, at any one time, three phase pairs are off. For example, if the motor lands on the two phase pair detent position, on condition (A, −B), then phase pairs C, D, and E are off. The back emf voltage generated in this condition is at maximum 90 electrical degrees from the vector direction of the position vector (A, −B), which corresponds to phase pair D as shown on FIG. 2. Therefore, measuring the back emf voltage across open phase pair D will produce a velocity feedback signal with maximum linearity and minimum error due to nonlinearity. The velocity feedback signal is applied either to at least one of the other open phase pairs or to at least one of the energized phase pairs to produce damping.

Further, in another embodiment, the back emf voltage across one open phase pair is added to the back emf voltage across another open phase pair to produce a velocity feedback signal with a vector direction 90 degrees from the position vector, as is shown on FIG. 2. Thus, in the above example, by adding the back emf voltage signal measured across open phase pair C to the back emf voltage signal measured across open phase pair E, a velocity feedback signal is produced with maximum linearity and minimum error due to nonlinearity i.e., due to variations in value of back emf constant with rotor angle. The velocity feedback signal is applied to one of the energized phase pairs A or B, or to another of the remaining open phase pair D to produce damping.

Figure 6:
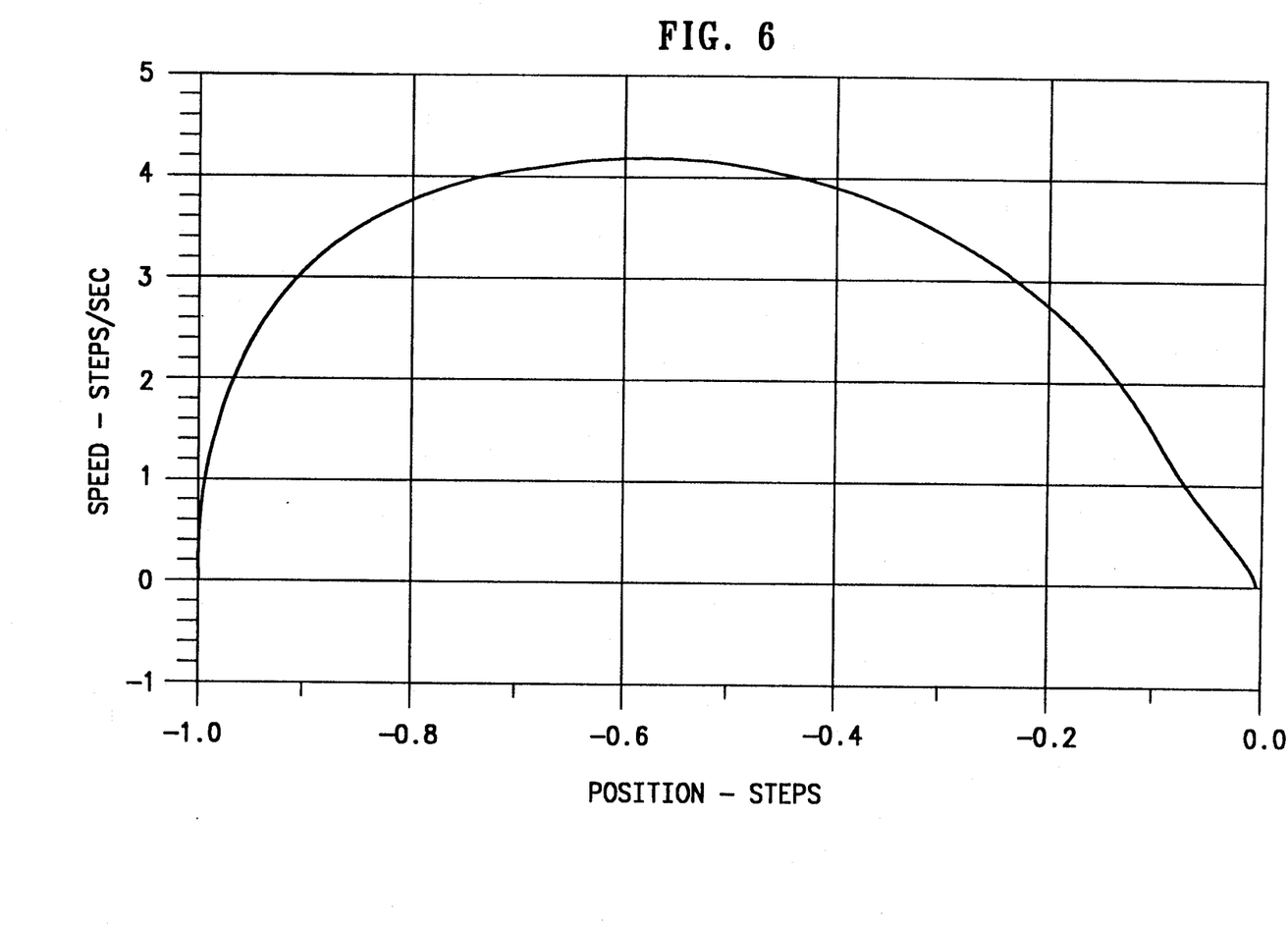
FIG. 6 is a phase plane diagram which illustrates the velocity and position response where one of the open phase pairs can be used to control the other two open phases pairs.

FIG. 6 illustrates the improved response of the step motor with the application of the closed loop velocity feedback method of the present invention for two phase pairs.

When the motor is stepped with four phase pairs on, at any one time, only one phase pair is off. For example, if the motor lands on the four phase pair detent position, on condition (A, −B,C, −E), then only phase pair D is off. The back emf voltage generated at this condition is maximum 90 electrical degrees from the vector direction of the position vector (A, −B,C, −E), which corresponds to open phase pair D as is shown on FIG. 2. Therefore, measuring the back emf voltage across open phase winding D will result in a velocity feedback signal with nearly minimal error due to nonlinearity. Because D is the only open phase pair, the velocity feedback signal is applied to at least one of the energized phase pairs, A, B, C, or D, to produce damping.

The present invention can also be used to apply partial or fractional currents to an on-phase pair to allow for microstepping to positions not on the detent positions shown in FIG. 2. For example, with three phase pairs A, B, E on and ½ current in on-phase pair C, the motor will be positioned between vectors 15 and 16 on FIG. 2. The back emf voltage is measured from the only open phase pair, D. The resulting velocity feedback signal is applied to control on-phase pair C to achieve further microstep positioning.

The present invention provides damping by closed-loop velocity feedback to position a motor on its natural detent position and can be used in conjunction with open or closed-loop position feedback for microstepping to nondetent positions. Thus, in the preferred embodiment, when used in computer memory disc drives, the invention can provide faster data acquisition through reduced settling time and seek time.

FIG. 7 shows circuitry which combines the closed-loop voltage feedback of the invention with open or closed-loop position feedback to produce a damping signal for microstepping. Initially, open-loop position seek is used to bring the read/write transducer of a disc drive near the target track. Velocity feedback is then used to dampen the motor in order to settle the transducer. Once the transducer is settled sufficiently, servo information is read from either the disc having the target track or an associated disc depending on the servo scheme chosen to produce a closed-loop position feedback signal, called the position error signal (PES) 70. In a typical servo scheme, the signal PES 70 represents the difference between the A and B servo signals written on the disc.

Figure 1B:
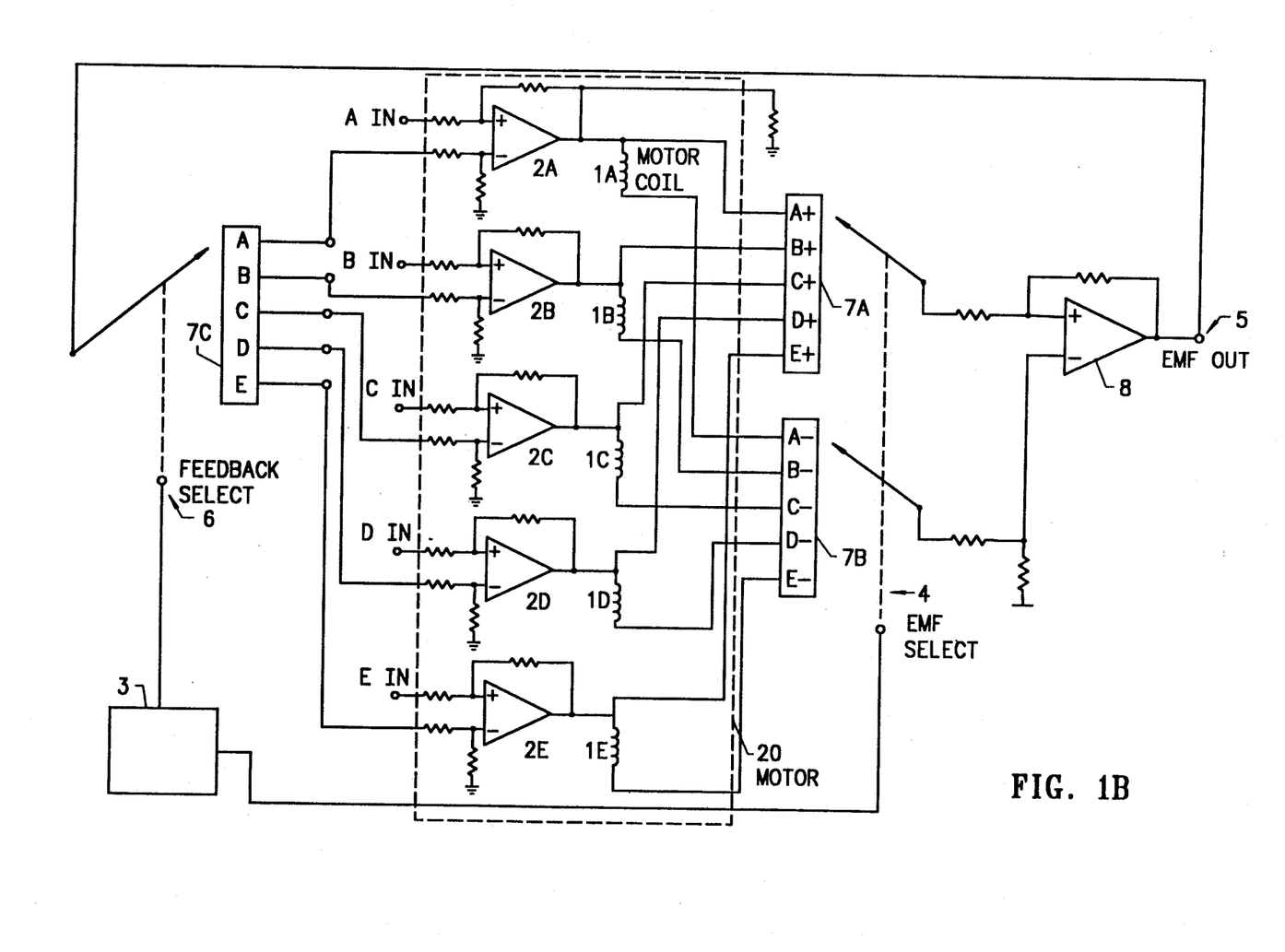

As shown in FIG. 7, the signal PES is combined with the position servo signal (PSS) 71. This signal typically represents the sum of two or more servo signals written on the disc and is substantially constant relative to position but varies with signal strength from the read head. It can therefore be used in the analog servo IC 80 to perform an automatic gain control function on the PES 70 in accordance with known technology. The resulting servo compensated signal CPES 72 is combined with the closed-loop velocity feedback signal 5 which is shown as the output of the circuitry of FIG. 1 of the present invention to produce a linear damping signal ST-ANALOG 73.

Damping signal 73 is finally applied to the on-phase winding which is energized with partial current in order to achieve nondetent positioning, and accordingly, to servo the transducer on-track.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. For use with a multi-phase step motor positionable with respect to selected detent positions, wherein a plurality of phases of said motor are energized to position the motor, the motor step size is sufficiently small compared to one electrical cycle of the back emf voltage of said step motor that the nonlinear component of the back emf voltage is small, a system for producing a continuous closed-loop voltage feedback signal, proportional to the velocity of said step motor, for damping, comprising:

means to sample said back emf voltage induced in an open phase winding;

first select means to select a particular open phase winding to sample said back emf voltage therefrom;

means to apply said sampled back emf voltage to a phase winding to produce damping;

second select means to select one of said energized phase windings to apply said sampled back emf voltage thereto; and microprocessor means to control said first and second select means whereby microstepping of said motor to a position between said selected detent positions is achieved.

2. A system as claimed in claim 1 wherein said second select means are operative to apply said sampled back emf voltage to an open phase winding of said motor.

3. A system as claimed in claim 2 wherein said step motor is a ten-phase step motor and said system includes means for driving said motor in a half step mode with said motor being driven with two/three, three/four or four/five phase pairs.

4. A system as claimed in claim 1 wherein step motor comprises phase pairs selectively energized to position said step motor and wherein said microprocessor means control said first select means to select a phase as near as possible to the maximum number of electrical degrees from the position vector of the energized phases of the motor.

5. A system as claimed in claim 4, further including first sampling means for sampling said back emf voltage across one open phase winding of said step motor to produce a first signal;

second sampling means for sampling the back emf voltage across the other open phase winding of said step motor to produce a second signal and inverting said second signal;

means for adding said inverted second signal to said first signal to produce a feedback signal proportional to the velocity of said step motor with minimum nonlinear error; and means for applying said continuous feedback signal to said selected energized phase winding to produce damping.

6. A system as claimed in claim 5 wherein said first and second sampling means comprise means for sampling the back emf voltage across non-energized phases of said motor selected to produce said velocity feedback signal with a electrical vector direction as close as possible to 90 degrees from a position vector defined by energized phases of said stepper motor.

7. A closed-loop voltage feedback method to control the step response of a multiple-phase step motor which is stepped to respective positions by energizing selected phase pairs thereof, wherein the motor step size is small compared to one electrical cycle of the back emf voltage of said step motor, comprising the steps of:

sampling said back emf voltage across an open phase winding of said step motor to produce a continuous feedback signal proportional to the velocity of said step motor; and applying said continuous feedback signal to at least one energized phase winding to produce damping.

8. A method according to claim 7, including the further steps of:

sampling said back emf voltage across one open phase winding of said step motor to produce a first signal;

sampling the back emf voltage across the other open phase winding of said step motor to produce a second signal and inverting said second signal;

adding said inverted second signal to said first signal to produce a feedback signal proportional to the velocity of said step motor with minimum nonlinear error; and applying said feedback signal to at least one of the energized phase winding to produce damping.

9. A method according to claim 6, wherein said step motor has ten phases and is stepped with at least two energized phase pairs, including the steps of:

sampling said back emf voltage across one open phase winding of said step motor to produce a continuous feedback signal proportional to the velocity of said step motor; and applying said continuous feedback signal to at least one of the phase windings other than the phase winding where the back emf is sampled to produce damping.

10. A method according to claim 7, including the steps of:

sampling said back emf voltage across one open phase windings of said step motor to produce a first continuous signal;

sampling the back emf voltage across another open phase winding of said step motor to produce a second continuous signal;

adding said first continuous feedback signal to said second continuous feedback signal to produce a continuous feedback signal proportional to the velocity of said step motor with minimum nonlinear error; and applying said continuous feedback signal to at least one of the energized phase windings.

11. A method according to claim 7, wherein said step motor has ten phases and is stepped with four energized phase pairs, including further steps of:

sampling said back emf voltage across the open phase winding of said step motor to produce a continuous feedback signal proportional to the velocity of said step motor; and applying said continuous feedback signal to at least one of the energized phase windings to produce damping.

12. For use with a multi-phase step motor, wherein the motor step size is sufficiently small compared to one electrical cycle of the back emf voltage of said step motor that the nonlinear component of the back emf voltage is small, a system for producing a continuous closed-loop voltage feedback signal, proportional to the velocity of said step motor, and wherein a selected phase winding is energized with any level of current for microstepping to nondetent positions, a closed-loop voltage feedback method to control the step response of said motor, comprising the steps of:

sampling said back emf voltage across an open phase winding of said step motor to produce a feedback signal proportional to the velocity of said step motor; and applying said continuous feedback signal to one of said energized phase windings to produce damping.

13. A system as claimed in claim 12 wherein said feedback signal is applied to said selected phase driven by a fractional level of the current supplied to the phases of the motor.

14. A method according to claim 12 for use in positioning a transducer on a track of a disc in a disc drive, the further steps of reading servo information from a disc in said disc drive to generate a closed-loop position error signal, combining said position error signal and said velocity feedback signal to finally position said transducer on said track.

15. A method according to claim 14 including the further steps of generating a position sum signal and combining said position sum signal with said position error signal in a manner to provide automatic gain control therefore, generating a servo compensated signal for combining with said velocity feedback signal.

* * * * *